(No Model.)
LE ROY W. STEVENS.
HARROW.
No. 412,428. Patented Oct. 8, 1889.
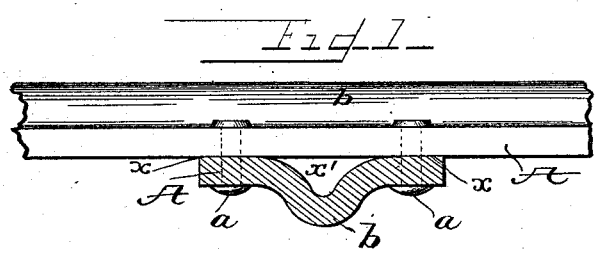
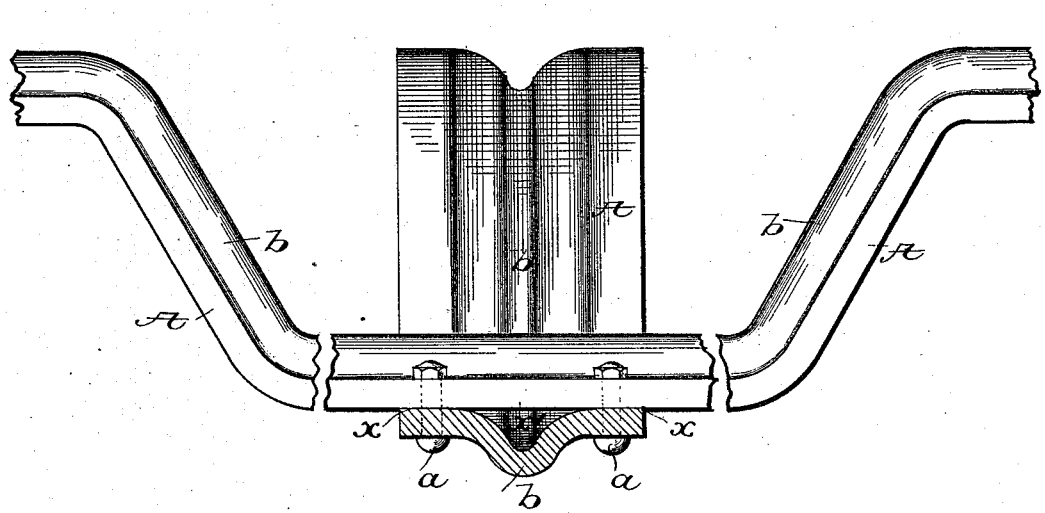

UNITED STATES PATENT OFFICE.

LE ROY W. STEVENS, OF AUBURN, NEW YORK.

HARROW.

SPECIFICATION forming part of Letters Patent No. 412,428, dated October 8, 1889.

Application filed April 27, 1889. Serial No. 308,817. (No model.)

*To all whom it may concern:*

Be it known that I, LE ROY W. STEVENS, a citizen of the United States, residing at Auburn, in the county of Cayuga and State of New York, have invented certain new and useful Improvements in Harrows; and I do hereby declare the following to be a full, clear, and exact description of the invention, such as will enable others skilled in the art to which it appertains to make and use the same.

My invention relates to harrows; and it consists of certain novel features of construction of the same, which will be fully disclosed in the specification and claims.

Heretofore it has been customary in the construction of harrows to form the bars and the supports of flat pieces and to join them together with bolts and nuts, and the result of this has been that the implements have in a short time been much impaired by rust, which occurs at the points where the two parts are joined and from the constant loosening of the bolts and the consequent racking of the frame.

The object of my invention is to remedy these objections and to provide a construction which will obviate the difficulties heretofore experienced, and to this end I provide the parts with corrugations and use rivets instead of bolts to secure them together.

In the drawings illustrating my invention, Figure 1 is a view of two flat bars connected by means of rivets. Fig. 2 represents curved bars joined by means of bolts and nuts, the ends of the bolts being flattened.

Similar letters of reference indicate identical parts.

A B represent the cross-bars and draft-bars of a harrow, which are provided with corrugations *b* and intersect at *x*. The two bars in crossing each other have their flat facial surfaces in contact, and are rigidly secured at their points of intersection by rivets *a*. It will be noticed that owing to the corrugations *b* in the harrow-bars a considerable interior space *x'* is left between the central portion of the bars at their points of intersection, through which the air can freely circulate and quickly dry any dampness which may exist after the harrow has been used, and thus to a large degree prevent rust. The corrugations, moreover, have a tendency to drain the water away from the rivets and from the harrow.

My improved construction also enables me to oil or paint the parts where they intersect, and thus preserve the bars and the rivets. Where bolts are used to connect the parts, the openings through which the bolts are passed must of necessity be somewhat larger than the bolts, in order to admit them, and as a result some play of the parts follows, which increases with use and enlarges the openings to such an extent as to cause the frame to rack and finally spoil the harrow. In using rivets this is avoided. The openings are slightly larger than the rivets when the latter are inserted; but when the ends are compressed the diameter of the body of the rivet is so increased as to entirely fill its opening and absolutely prevent any play. Bolts and nuts may be used, however, for this purpose, as shown in Fig. 2, the ends of said bolts being flattened upon the outer surface of the nuts.

The air-space *x'* is especially valuable and necessary where arched bars are used, as the water naturally drains toward the point of intersection and lodges there, where, being acted upon by the air in the air-space, it quickly evaporates, leaving the parts dry.

What I claim, and desire to secure by Letters Patent, is—

1. In a harrow, the arrangement and combination of bars crossing each other and being connected at their points of intersection by means of rivets, one of said bars being corrugated, substantially as described.

2. In a harrow, the combination and arrangement of corrugated draft and cross bars connected at their point of intersection by means of rivets, substantially as described.

3. A harrow-frame provided with bars grooved or channeled at their points of crossing and rigidly secured to each other at their intersection by metallic fastenings clinched at a point exterior to the surface of the bars, substantially as described.

4. A harrow-frame provided with arched bars grooved or channeled at their points of crossing and rigidly secured to each other at their intersection by rivets, substantially as described.

5. In a harrow, the combination and arrangement of corrugated metallic draft and cross bars having their flat facial surfaces at their point of intersection in direct contact with each other and being secured together by means of rivets, substantially as described.

6. A harrow-frame provided with arched bars rigidly secured to each other by metallic fasteners clinched at a point exterior to the surface of the bars, substantially as described.

In testimony whereof I affix my signature in presence of two witnesses.

LE ROY W. STEVENS.

Witnesses:
WARREN M. BRINKERHOFF,
WALTER A. NYE.